United States Patent
Jung

(10) Patent No.: US 7,415,720 B2
(45) Date of Patent: Aug. 19, 2008

(54) USER AUTHENTICATION SYSTEM AND METHOD FOR CONTROLLING THE SAME

(75) Inventor: Joon-Wook Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 699 days.

(21) Appl. No.: 10/954,675

(22) Filed: Sep. 30, 2004

(65) Prior Publication Data

US 2005/0097261 A1    May 5, 2005

(30) Foreign Application Priority Data

Oct. 31, 2003 (KR) .................. 10-2003-0076870
Aug. 24, 2004 (KR) .................. 10-2004-0066699

(51) Int. Cl.
*H04L 9/32* (2006.01)
*H04L 9/00* (2006.01)

(52) U.S. Cl. .................. 726/2; 726/27; 726/28; 713/183

(58) Field of Classification Search .......... 713/168, 713/183; 726/2, 20, 27–28
See application file for complete search history.

(56) References Cited

U.S. PATENT DOCUMENTS

| 5,892,906 A * | 4/1999 | Chou et al. ............. 726/19 |
| 2001/0036273 A1 | 11/2001 | Yoshizawa |
| 2003/0008672 A1 | 1/2003 | Fujii |
| 2003/0014751 A1 | 1/2003 | Paek |

* cited by examiner

*Primary Examiner*—Hosuk Song
(74) *Attorney, Agent, or Firm*—The Farrell Law Firm, PC

(57) ABSTRACT

A user authentication system and method using a password. A method for performing an operation mode associated with a password in the system having a password setup function, includes the steps of setting up a general password for normal user authentication and an emergency password needed for an emergency operation mode, and storing them in a memory; and upon receiving a password from a user, performing the normal user authentication when the user-entry password matches the general password, and performing the emergency operation mode when the user-entry password matches the emergency password.

23 Claims, 4 Drawing Sheets

USER AUTHENTICATION SYSTEM AND METHOD FOR CONTROLLING THE SAME

PRIORITY

This application claims priority to applications entitled "USER AUTHENTICATION SYSTEM AND METHOD FOR CONTROLLING THE SAME", filed in the Korean Intellectual Property Office on Oct. 31, 2003 and assigned Ser. No. 2003-76870, and on Aug. 24, 2004 and assigned Ser. No. 2004-66699, the contents of which are hereby incorporated by reference.

BACKGROUND OF THE INVENTION

1. Field of the Invention

The present invention relates to a user authentication system and method, and more particularly to an apparatus and method for establishing user authentication using a password.

2. Description of the Related Art

A conventional user authentication scheme can be established by using a password, by allowing a user to enter his or her prescribed numeric or character information. In this case, the user authentication scheme normally operates on the condition that the input password of the user is equal to or matches the predetermined password. However, the user authentication scheme using passwords has a disadvantage in that it may allow a fraudulent user who recognizes a password of a target system, instead of a correct user, to fraudulently receive a user authentication message.

The aforementioned user authentication system has been widely used for a variety of applications, for example, credit cards, cash cards, mobile phones, computers, etc. FIG. 1 is a conceptual diagram illustrating a user authentication system for credit cards. Referring to FIG. 1, a card reader 10 reads a credit card of a user, and transmits the read card information and the user-entry card password information to a card certification authority 20. The card certification authority 20 determines if the card having the read information is effective or ineffective, and determines if the card password matches to a predetermined card password. If it is determined that the card password matches to the predetermined card password, the card certification authority 20 transmits the result to the card reader 10 in such a way that the user authentication is established.

Another user authentication operation when the card reader 10 is in a cash dispenser will hereinafter be described with reference to FIG. 2. FIG. 2 is a flow chart illustrating a conventional user authentication process upon receiving a password from a user. Referring to FIG. 2, if a user inserts his or her cash card into the card reader 10 to withdraw his or her savings from the bank, the card reader 10 recognizes the inserted cash card, and commands the user to enter his or her password in order to determine if a current user is a correct user. The user enters his or her password according to the password input request at step 200. The card reader commands the card certification authority 20 to determine if the input password matches a predetermined user password at step 204. Upon receiving the user authentication result from the card certification authority 20 that the input password matches the predetermined user password, the card reader 10 performs a user-desired operation according to the user authentication result at step 206. Otherwise, if the user-entry password does not match the predetermined user password, the card reader commands the user to re-enter his or her password a predetermined number of times at step 208 and 210. If the number of password re-entry times is higher than the predetermined number of times, the card reader 10 terminates its operation. In more detail, although another user instead of a correct user fraudulently recognizes a card password of the correct user, the conventional user authentication system unavoidably enables the fraudulent user to receive a desired user authentication message so that the fraudulent user can receive his or her desired service from a service provider such as a bank. However, the conventional user authentication system has not taken into consideration the risk of fraudulent misuse of the card. For example, if a thief robs the user of a credit or cash card and the user unavoidably tells the thief his or her card password, the thief may rob the user of his or her private property.

In conclusion, the conventional user authentication system has been designed to unconditionally establish user authentication when receiving a predetermined password from a user or a third-party user who recognizes the user's card password, such that it allows even the third-party user to receive a desired service from a service provider, resulting in the risk of fraudulent misuse of the card due to authentication of the wrong user.

SUMMARY OF THE INVENTION

Therefore, the present invention has been made in view of the above problems, and it is an object of the present invention to provide a user authentication system and method for controlling a system capable of performing a password setup operation to prevent an unauthorized third-party user from being authenticated.

It is another object of the present invention to provide a user authentication system and method for indicating an alarm condition when receiving a password for user authentication from a user who is in danger.

In accordance with one aspect of the present invention, the above and other objects can be accomplished by the provision of a user authentication apparatus for use in a system having a password setup function, comprising: a memory for setting up a plurality of passwords and individual operation modes associated with the passwords, and storing them; and a controller for receiving a password from a user, reading an operation mode associated with the received password from the memory, and performing the read operation mode.

In accordance with another aspect of the present invention, there is provided a user authentication method for use in a system having a password setup function to perform an operation mode associated with a user-entry password, comprising the steps of setting up a plurality of passwords and individual operation modes associated with the passwords, and storing them in a memory; and upon receiving a password from a user, reading an operation mode associated with the received password from the memory, and performing the read operation mode.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
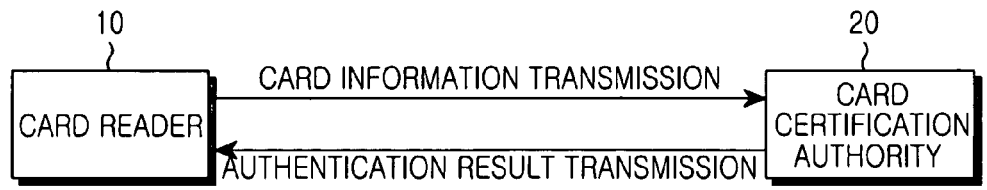
FIG. 1 is a block diagram illustrating a conventional user authentication system for credit cards.
Figure 2:
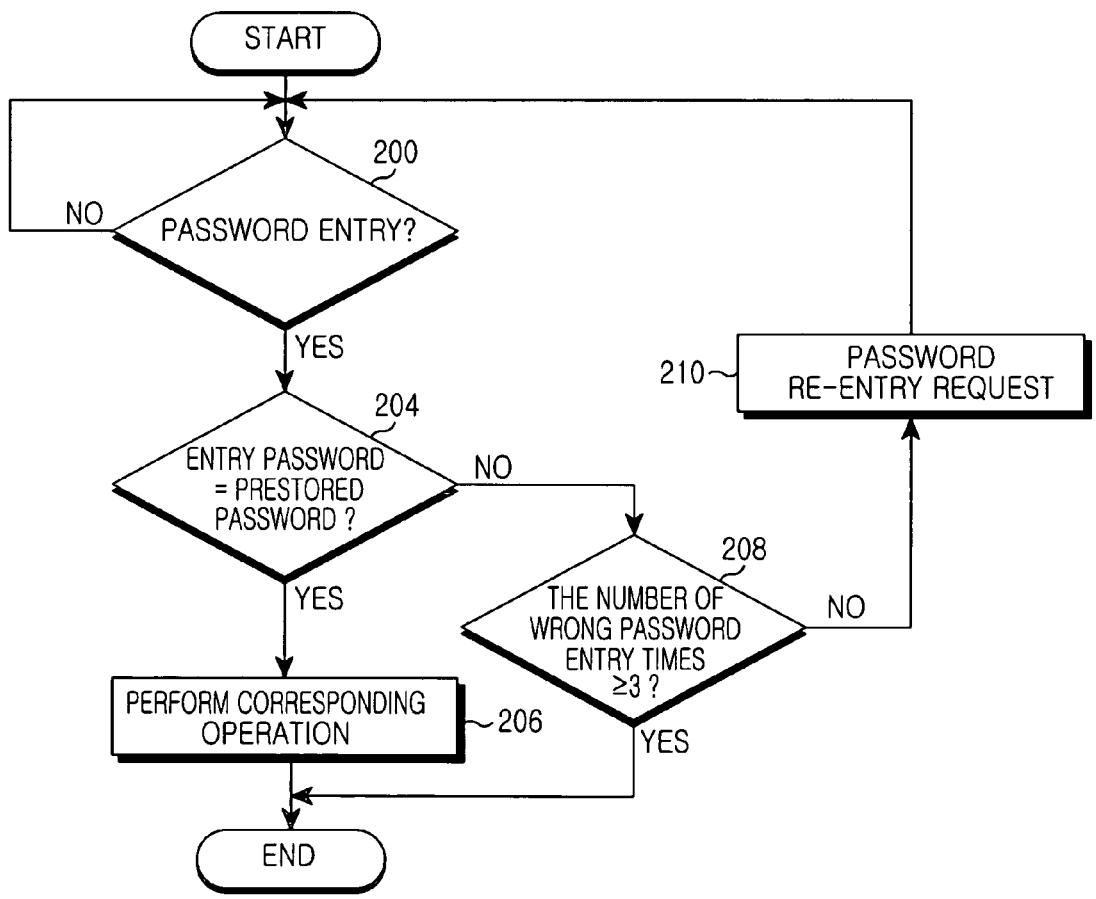
FIG. 2 is a flow chart illustrating a conventional user authentication method using a password entry scheme.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

The present invention enables a system requiring a password setup process to set up an emergency password needed to perform emergency operations in case of an emergency along with a general password needed to perform general operations, so that it can activate a necessary operation mode associated with an input password applied to the system. This system can be applicable to a variety of applications, for example, mobile phones, credit cards, cash cards, computers, etc.

Figure 3:
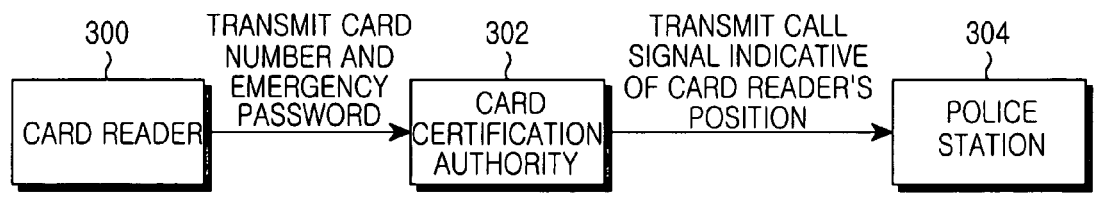
FIG. 3 is a block diagram illustrating a card authentication system in accordance with a preferred embodiment of the present invention.

In order to enable a user to use his or her card using the aforementioned system, the user must predetermine and store a general password for user authentication and an emergency password for use in case of emergency, and a representative example for performing necessary operations upon receiving a password from the user will hereinafter be described with reference to FIG. 3. FIG. 3 is a block diagram illustrating a card authentication system where more than one password is set up to perform user authentication so that a corresponding operation associated with the setup password may be performed.

Referring to FIG. 3, during a password setup process for user authentication, a card user determines at least one general password for general operations and an emergency password for informing others of an emergency, and stores the determined passwords in a card certification authority 302. If the user inserts his or her card into the card reader 300 to use the card, the card reader 300 transmits a user-entry password and card information to the card certification authority 302 in such a way that a user authentication request message is transmitted to the card certification authority 302. In this case, if the user-entry password is determined to be the general password, the card certification authority 302 conducts a general user authentication process. Otherwise, if the user-entry password is determined to be the emergency password, the card certification authority 302 recognizes an emergency condition so that it can conduct a predetermined emergency operation mode. The emergency operation mode is adapted to inform others of specific emergency states, for example, a first emergency state where a third-party person instead of a true user attempts to fraudulently use the true user's card upon receiving a user authentication message from a server, a second emergency state where the true user attempts to inform others of an emergency by directly entering the emergency password in the card reader 300, etc., such that timely solutions of such emergency states can be conducted. If a current operation mode is changed to the emergency operation mode upon receiving the emergency password from the card reader 300, the card certification authority 302 preferably informs a public institution such as a police station of a geographical position of the card reader 300 so that the police can timely move to the position of the card reader 300 to solve the user's emergency. For example, if a thief steals a true user of a cash or credit card, and threatens the true user to force the true user to tell the burglar his or her password, the true user may tell the burglar his or her emergency password instead of his or her general password. Upon receiving the emergency password from the card reader, the card certification authority 302 informs the police station of a geographical position of a cash dispenser simultaneously with requesting the mobilization of the police from the police station, and delays withdrawal of money from the cash dispenser as long as it can. In this case, the card certification authority 302 controls the card reader 300 or cash dispenser to display a specific message such as "Processing, please wait a minute", reduces the limits of withdrawable cash to minimize the amount of damage, and commands the card reader 300 or cash dispenser to display the reduced limits of withdrawable cash so that it can conduct a user authentication process differently from a general user authentication process activated by the general password.

Figure 4:
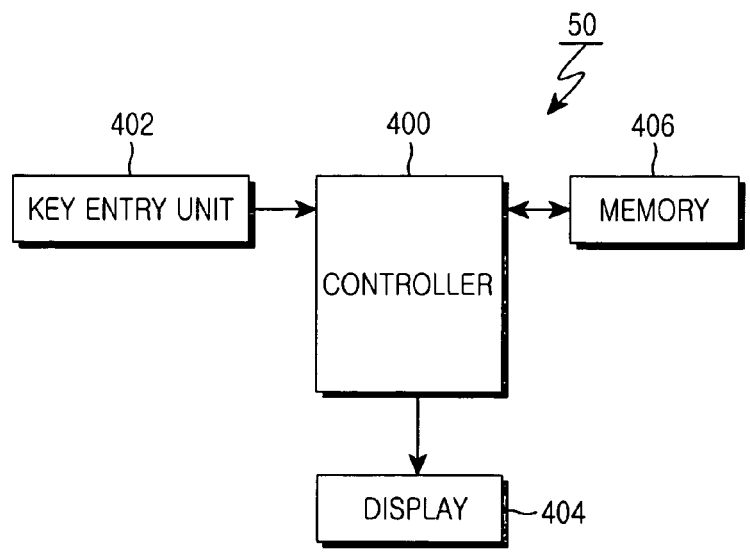
FIG. 4 is a block diagram illustrating a system for performing a corresponding operation mode upon receipt of a password in accordance with another preferred embodiment of the present invention.

Another example for controlling a system (e.g., a mobile phone or a computer) capable of setting up a user authentication password simultaneously with authenticating a credit or cash card user to conduct different operation modes according to input password information will hereinafter be described with reference to FIG. 4. FIG. 4 is a block diagram illustrating a user authentication system capable of setting up a password in accordance with another preferred embodiment of the present invention.

Referring to FIG. 4, a controller 400 controls overall operations of the user authentication system of FIG. 4. Upon receiving more than one password from a user, the controller 400 stores the received passwords in a memory 406, determines an operation mode corresponding to a stored password, and stores the determined operation mode in the memory 406. If the user enters his or her password using a key entry unit 402, the controller 400 performs a predetermined operation mode associated with the user-entry password. For example, provided that important private data of the user is stored in a computer, the user further sets up his or her private password in a different way from a general password. If the system is initialized using the private password, the user may gain access to the important private data. Otherwise, if the system is initialized using the general password, the user's access to the important data may be denied. In more detail, the user authentication system shown in FIG. 4 allows the user to set up one or more passwords, set up operation modes associated with the setup password information, and then conducts a necessary operation mode according to the received password information.

If the emergency password and the general password are set up differently from each other using an electronic appliance which can conduct electronic payment transactions, for example, a computer or a mobile terminal, the system recognizes a fraudulent access attempt of an unauthorized user upon receiving the emergency password from the card reader, conducts a predetermined emergency operation mode, and at the same time controls the electronic appliance to enter a specific operation mode as if the electronic appliance were normally operated.

Figure 5:
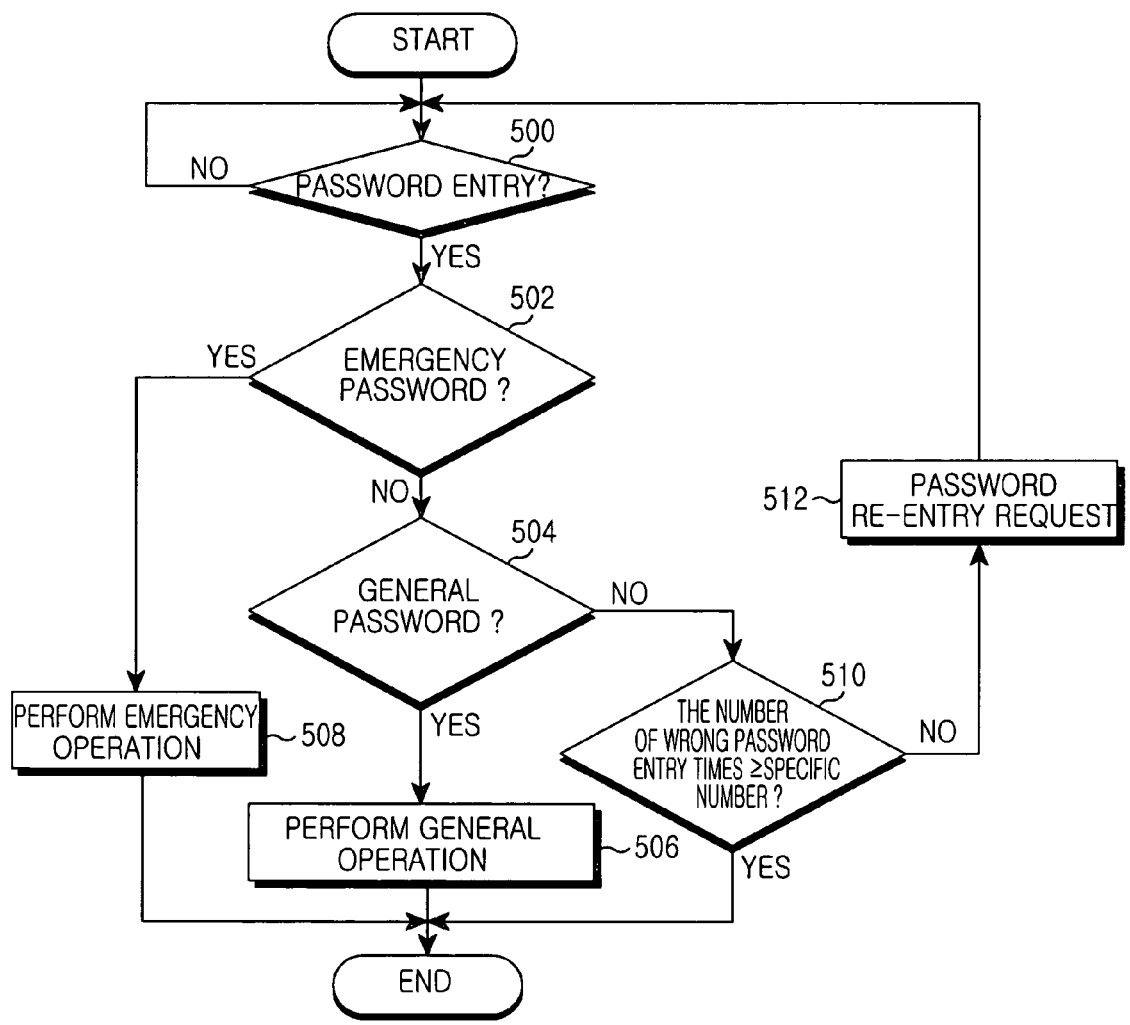
FIG. 5 is a flow chart illustrating a method for controlling a card authentication system to perform a corresponding operation mode upon receipt of a password in accordance with a preferred embodiment of the present invention.

A method for conducting operation modes associated with individual passwords will hereinafter be described with reference to FIG. 5. FIG. 5 is a flow chart illustrating a method for conducting operation modes determined by one or more passwords. In this case, a user authentication process associated credit or cash cards is shown in FIG. 5.

If an input password is determined to be a password for authenticating a user of a credit or cash card, the user must previously set up a general password for general operations and an emergency password indicative of the occurrence of emergency situations, and must store the setup passwords in the card certification authority via a credit-card company or an issuing bank of the user's card. If the user enters his or her password in the card reader 300 to transmit a user authentication request message to the card certification authority 302 at step 500, the card certification authority 302 determines whether the user-entry password matches to either the emergency password or the general password at step 502. If it is determined that the user-entry password matches to the emergency password, the card certification authority 302 enters an emergency operation mode at step 508. In more detail, upon receiving the emergency password from the user, the card certification authority 302 determines that an unauthorized user attempts to gain access to the card reader 300, and provides a public institution such as a police station with geographical position information of the card reader 300, so that the police can timely move to the position of the card reader 300. The card certification authority 302 commands the card reader 300 to delay withdrawal of money from the bank for as long as possible until the police reach the position of the card reader 300. If it is determined that the user-entry password does not match to the emergency password at step 502, the card certification authority 302 determines if the user-entry password matches to the general password at step 504. If it is determined that the user-entry password matches the general password at step 504, the card certification authority 302 controls the card reader 300 to determine that a current user is a true user, so that the true user can receive his or her desired service from the bank. If it is determined that the user-entry password is neither the emergency password nor the general password, the card certification authority 302 determines if the number of times of the wrong password entry is greater than a predetermined number of times at steps 510 and 512. If it is determined that the number of wrong password entries is greater than the predetermined number of times, the card certification authority 302 refuses to accept the user authentication request. Otherwise, if it is determined that the number of wrong password entries is the same or less then the predetermined number of times, the card certification authority 302 commands the user to re-enter his or her password at step 512.

In conclusion, upon receiving the emergency password composed of specific numeric or character information from electronic appliances capable of setting up a user password, the present invention recognizes a fraudulent access attempt of an unauthorized user, so that it controls the card certification authority to enter a predetermined operation mode associated with the emergency password.

Figure 6:
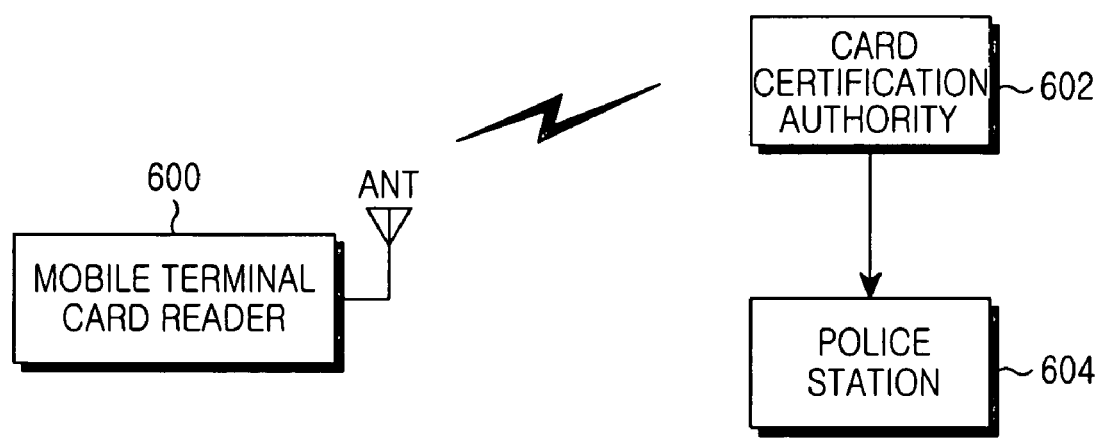
FIG. 6 is a conceptual diagram illustrating a mobile terminal including a card in accordance with yet another preferred embodiment of the present invention.

Additionally, the present invention can be applied to a mobile terminal (also called a hand-held phone) including a card. FIG. 6 is a conceptual diagram illustrating a mobile terminal including a card in accordance with yet another preferred embodiment of the present invention.

Referring to FIG. 6, if a user of the mobile terminal 600 enters a password, the mobile terminal 600 transmits a user-entry password and card information to the card certificate authority 602 in such a way that a user authentication request message is transmitted to the card certificate authority 602. In this case, if the user-entry password is identified as the general password, the card certificate authority 602 conducts a general user authentication process. However, if the user-entry password is identified as the emergency password, the card certificate authority 602 recognizes a user emergency and operates in accordance with a predetermined emergency operation mode. For example, upon receiving the emergency password, the card certificate authority 602 determines that the user of the mobile terminal 600 is in an emergency state, and informs a public institution such as a police station of the emergency state of the user.

The card certificate authority 602 may determine whether the password transmitted from the mobile terminal 600 is the general password or the emergency password, and may also determine whether the user-entry password of the mobile terminal 600 is correct or not.

When determining whether the user-entry password of the mobile terminal 600 is correct or not, the general password and the emergency password must be prestored in the mobile terminal 600. If it is determined that the user-entry password is the general password, a general user authentication process is performed by the card certificate authority 602.

However, if it is determined that the user-entry password is the emergency password, the mobile terminal 600 transmits a signal for the emergency state to the card certificate authority 602, such that the card certificate authority 602 transmits a geographical position signal of the mobile terminal 600 to a predetermined contact department or public institution such as a police station, and requests the mobilization of the police from the police station. In this case, the signal for the emergency state may also be directly transmitted to the emergency contact department or police station without passing the card certificate authority 602. Upon receiving the signal for the emergency state, the card certificate authority 602, the emergency contact department, or police station tracks the position of the mobile terminal 600, such that the user can be helped.

As apparent from the above description, the present invention controls an electronic appliance having a password setup function to set up an emergency password indicative of a fraudulent access attempt of an unauthorized user in emergency situations along with a general password needed for normal user authentication, and requests that an associated institution such as a police station move personnel to a position of a corresponding card reader, resulting in a minimum amount of damage to a user or associated enterprise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A user authentication apparatus for use in a system having a password setup function, comprising:
  a memory for setting up and storing a plurality of passwords and individual operation modes associated with the passwords; and
  a controller for receiving a password from a user, determining an operation mode associated with the received password from the memory, and performing the read operation mode, wherein at least one of the operation modes is an emergency operation mode.

2. The apparatus as set forth in claim 1, wherein the memory stores a general password associated with an operation mode needed for a first general function of the user authentication apparatus and an emergency password associated with the emergency operation mode indicative of an emergency situation of the user.

3. The apparatus as set forth in claim 2, wherein the first general function is a user authentication function.

4. The apparatus as set forth in claim 2, wherein the controller enters a user authentication operation mode upon receiving the general password from the user, and enters the emergency operation mode upon receiving the emergency password from the user.

5. The apparatus as set forth in claim 4, wherein the emergency operation mode performs the user authentication operation mode, and at the same time informs a predetermined public institution such as a police station of the occurrence of emergency situation.

6. The apparatus as set forth in claim 4, wherein the system is one of a mobile terminal and a hand-held phone.

7. The apparatus as set forth in claim 4, wherein the system is a card certificate authority.

8. A user authentication system, comprising:
a memory for storing a general password which is adapted to perform a general operation mode of the system and an emergency password which is adapted to perform an emergency operation mode; and
a controller for receiving a password from a user, performing the general operation mode when the user-entry password matches the general password, and performing the emergency operation mode when the user-entry password matches the emergency password.

9. The system as set forth in claim 8, wherein the emergency operation mode performs the general operation mode for user authentication, and simultaneously informs a predetermined public institution of an occurrence of an emergency condition.

10. The system as set forth in claim 8, wherein the general operation mode includes a user authentication process.

11. The system as set forth in claim 8, wherein the emergency operation mode includes recognition of a fraudulent access attempt by an unauthorized user.

12. The system as set forth in claim 8, wherein the general operation mode is an operation mode for an authenticated user.

13. The system as set forth in claim 8, wherein the emergency operation mode is an operation mode for an unauthenticated user.

14. The system as set forth in claim 8, wherein the system is one of a mobile terminal and a hand-held phone.

15. The system as set forth in claim 8, wherein the system is a card certificate authority.

16. A user authentication method for use in a system having a password setup function to perform an operation mode associated with a user-entry password, comprising the steps of:
establishing a plurality of passwords and individual operation modes associated with the passwords;
storing the plurality of passwords and the individual operation modes associated with the passwords in a memory; and
upon receiving a password from a user, determining an operation mode associated with the received password from the memory, and performing the read operation mode, wherein at least one of the operation modes is an emergency operation mode.

17. The method as set forth in claim 16, wherein the step of establishing the plurality of passwords and the individual operation modes associated with the passwords comprises the step of:
setting up a general password for performing a first general function and an emergency password for an emergency situation.

18. The method as set forth in claim 17, wherein the first general function is a user authentication function.

19. The method as set forth in claim 17, wherein the reading and performing steps of the operation mode comprise the step of:
performing the general function when the user-entry password matches the general password, and performing the emergency operation mode when the user-entry password matches the emergency password.

20. The method as set forth in claim 17, wherein the emergency operation mode performs a user authentication operation mode, and simultaneously informs a predetermined public institution of an occurrence of the emergency situation.

21. The method as set forth in claim 17, wherein the emergency operation mode informs a predetermined public institution of an occurrence of the emergency situation, and simultaneously delays a user authentication processing speed.

22. The method as set forth in claim 16, wherein the system is one of a mobile terminal and a hand-held phone.

23. The system as set forth in claim 16, wherein the system is a card certificate authority.

* * * * *